(12) United States Patent
Beaudoin et al.

(10) Patent No.: US 10,466,131 B2
(45) Date of Patent: Nov. 5, 2019

(54) SYSTEM AND BIDRECTIONAL DIFFERENTIAL PRESSURE SENSOR FOR ADJUSTING MEASURED PRESSURE DIFFERENTIAL

(71) Applicant: DISTECH CONTROLS INC, Brossard (CA)

(72) Inventors: Daniel Beaudoin, Chambly (CA); Dominic Gagnon, St-Bruno-de-Montarville (CA); Pascal Gratton, Montreal (CA); Simon Benoit, Brossard (CA)

(73) Assignee: DISTECH CONTROLS INC., Brossard (CA)

( * ) Notice: Subject to any disclaimer, the term of this patent is extended or adjusted under 35 U.S.C. 154(b) by 288 days.

(21) Appl. No.: 15/261,115

(22) Filed: Sep. 9, 2016

(65) Prior Publication Data

US 2018/0073952 A1    Mar. 15, 2018

(51) Int. Cl.
*G01L 27/00* (2006.01)
*G01L 13/00* (2006.01)
*G01L 19/08* (2006.01)

(52) U.S. Cl.
CPC ............ *G01L 27/002* (2013.01); *G01L 13/00* (2013.01); *G01L 19/08* (2013.01)

(58) Field of Classification Search
CPC ....... G01L 27/002; G01L 19/08; G01L 13/00; G01L 13/02; G01L 13/021; G01L 13/023; G01L 13/025; G01L 13/026; G01L 13/028; G01L 13/04; G01L 13/06
See application file for complete search history.

(56) References Cited

U.S. PATENT DOCUMENTS

| | | |
|---|---|---|
| 4,476,725 A | 10/1984 | Chorel et al. |
| 4,606,229 A | 8/1986 | Spence |
| 5,003,825 A | 4/1991 | Lew |
| 5,231,881 A | 8/1993 | Lew |
| 5,804,735 A | 9/1998 | Biskup |
| 5,899,962 A | 5/1999 | Louwagie et al. |
| 6,134,969 A | 10/2000 | Studer et al. |
| 6,725,731 B2 | 4/2004 | Wiklund et al. |

(Continued)

OTHER PUBLICATIONS

AMSYS, Application note aan505: Differential pressure measurement using the example of AMS 4712, Apr. 2008, 10 pages.

(Continued)

*Primary Examiner* — David M. Gray
*Assistant Examiner* — Andrew V Do
(74) *Attorney, Agent, or Firm* — RatnerPrestia (57) ABSTRACT

The present relates to a system and a bidirectional differential pressure sensor. The system and bidirectional differential pressure sensor comprise a first adaptor comprising an end configured to receive a first pipe, and a second adaptor comprising an end configured to receive a second pipe. The system and bidirectional differential pressure sensor further comprise a pressure sensing element determining a pressure differential between fluid received via the first adaptor with respect to fluid received via the second adaptor. The system or bidirectional differential pressure sensor further comprise a processing unit executing an algorithm for generating an adjusted pressure differential based on the pressure differential determined by the pressure sensing element.

14 Claims, 9 Drawing Sheets

(56) References Cited

U.S. PATENT DOCUMENTS

| | | | |
|---|---|---|---|
| 9,869,600 B2 * | 1/2018 | Haldorsen | G01L 27/005 |
| 2002/0095993 A1 | 7/2002 | Ferris | |
| 2007/0218827 A1 * | 9/2007 | Baik | F24F 13/1406 |
| | | | 454/246 |
| 2015/0019022 A1 | 1/2015 | Karamanos et al. | |
| 2016/0187218 A1 * | 6/2016 | Ite | G01L 13/025 |
| | | | 73/717 |
| 2018/0038755 A1 * | 2/2018 | Beaudoin | G01L 19/003 |
| 2018/0073952 A1 | 3/2018 | Beaudoin et al. | |

OTHER PUBLICATIONS

AMSYS, Application note aan510: Differential and bidirectional differential pressure sensors, taking AMS 5812 as an example, 7 pages.

Entire patent prosecution history of U.S. Appl. No. 15/225,867, filed Aug. 2, 2016, entitled "Differential Pressure Sensor Arrangement for an Environmental Control System".

* cited by examiner

SYSTEM AND BIDRECTIONAL DIFFERENTIAL PRESSURE SENSOR FOR ADJUSTING MEASURED PRESSURE DIFFERENTIAL

TECHNICAL FIELD

The present disclosure relates to the field of pressure sensors. More specifically, the present disclosure relates to a system or environment control appliance and a bidirectional differential pressure sensor configured to determine and adjust measured pressure differential of fluids coming from two different locations outside a housing.

BACKGROUND

In the field of environment control, sensors are often used to verify the environmental conditions in an area. One type of sensor often used is a pressure sensor. A differential type pressure sensor includes two or more ports for input of fluid from different locations in an environmental control system, e.g. at one location expected to have a higher pressure than at another location.

Pressure sensors used in the field of environment control have become over the years particularly small, as electronic components are used to measure the pressure. The small size of the pressure sensor renders it particularly difficult for technicians to visually identify the different fluid ports of the differential pressure sensor, often resulting in improper connection of the fluid pipes to the inputs of the pressure sensor.

SUMMARY

According to a first aspect, the present disclosure provides a system comprising a bidirectional differential pressure sensor, and first and second adaptors. The first adaptor comprises a proximal end configured to receive a first pipe, a distal end secured to the bidirectional differential pressure sensor, and an internal fluid conduit for conveying fluid received from the first pipe to the bidirectional differential pressure sensor. The second adaptor comprises a proximal end configured to receive a second pipe, a distal end secured to the bidirectional differential pressure sensor, and an internal fluid conduit for conveying fluid received from the second pipe to the bidirectional differential pressure sensor. The bidirectional differential pressure sensor comprises a pressure sensing element and a processing unit. The pressure sensing element determines a pressure differential between fluid received via the first adaptor with respect to fluid received via the second adaptor. The processing unit executes an algorithm for generating an adjusted pressure differential based on the pressure differential determined by the pressure sensing element.

According to a second aspect, the present disclosure provides a bidirectional differential pressure sensor. The bidirectional differential pressure sensor comprises first and second adaptors, a pressure sensing element and a processing unit. The first adaptor comprises an end configured to receive a first pipe. The second adaptor comprises an end configured to receive a second pipe. The pressure sensing element determines a pressure differential between fluid received via the first adaptor with respect to fluid received via the second adaptor. The processing unit executes an algorithm for generating an adjusted pressure differential based on the pressure differential determined by the pressure sensing element.

According to a third aspect, the present disclosure provides a system comprising a bidirectional differential pressure sensor, and a processing unit. The bidirectional differential pressure sensor comprises first and second adaptors and a pressure sensing element. The first adaptor comprises an end configured to receive a first pipe. The second adaptor comprises an end configured to receive a second pipe. The pressure sensing element determines a pressure differential between fluid received via the first adaptor with respect to fluid received via the second adaptor. The processing unit executes an algorithm for generating an adjusted pressure differential based on the pressure differential determined by the pressure sensing element of the bidirectional differential pressure sensor.

BRIEF DESCRIPTION OF THE DRAWINGS

Embodiments of the disclosure will be described by way of example only with reference to the accompanying drawings, in which.

DETAILED DESCRIPTION

The foregoing and other features will become more apparent upon reading of the following non-restrictive description of illustrative embodiments thereof, given by way of example only with reference to the accompanying drawings.

The following terminology is used throughout the present disclosure:

VAV appliance: A Variable Air Volume appliance is a type of heating, ventilating, and/or air-conditioning (HVAC) system. By contrast to a Constant Air Volume (CAV) appliance, which supplies a constant airflow at a variable temperature, a VAV appliance varies the airflow at a constant temperature.

Various aspects of the present disclosure generally address one or more of the problems related to connection of pipes carrying fluid to first and second adaptors of a bidirectional pressure sensor. More particularly, a processing unit executes an algorithm for generating an adjusted pressure differential based on the pressure differential determined by a pressure sensing element of the bidirectional pressure sensor, when the pressure differential determined by the pressure sensing element indicates that the pipes carrying fluid to the first and second adaptors of the bidirectional pressure sensor have been connected in reverse. Various embodiments of bidirectional pressure sensor and system will be described hereinafter.

Referring now concurrently to FIGS. 1-4, an example of a system 10 is represented. The system 10 is adapted for measuring a differential pressure between the fluid received through adaptors 40 and 50. Furthermore, the present system 10 and/or bidirectional pressure sensor 30 is further adapted for adjusting the sensed pressure when pipes of incoming fluid are connected in reverse to the adaptors 40 and 50.

The system 10 comprises a bidirectional differential pressure sensor 30 and a processing unit 60. In the Figures, the bidirectional differential pressure sensor 30 and the processing unit 60 are shown as being separate components, but the present system is not limited to such an implementation. For example, the bidirectional differential pressure sensor 30 and the processing unit 60 could be implemented as a single component, as shown on FIG. 5

The processing unit 60 supports a plurality of electrical and/or electronic components, such as one or more processing unit, one or more memory, an electrical power circuit, input/output interface, etc. (not represented in the Figures for simplification purposes).

As will be detailed later in the description, fluid received from two different locations is received from two pipes 70 and 80 (represented in FIG. 2) through two adaptors 40 and 50. The two adaptors 40 and 50 are shown in the Figures as passing through the housing. However, the present system 10 is not limited to such an implementation. For example, the two adaptors 40 and 50 could be located entirely outside the housing, or inside the housing.

The bidirectional differential pressure sensor 30 and the processing unit 60 may be secured to the housing of the system 10 via proper means out of the scope of the present disclosure, and not represented in the Figures.

Figure 4:
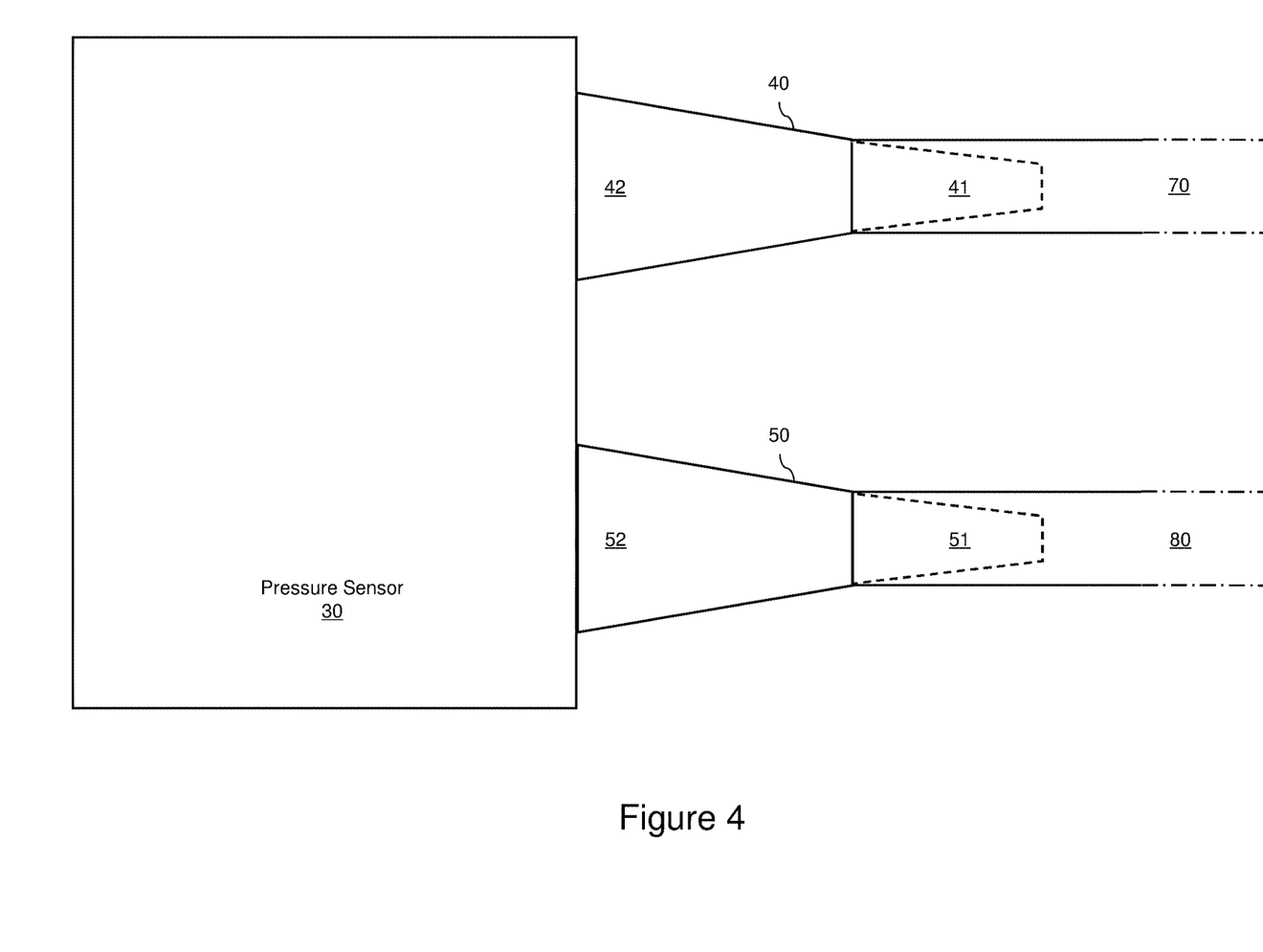
FIG. 4 represents two adaptors configured to transmit fluid from the pipes to the bidirectional pressure sensor represented in FIG. 2.

The first and second adaptors 40 and 50 may extend through the housing, but the present system 10 is not limited to such an implementation. The first adaptor 40 comprises a proximal end 41 configured to receive the first pipe 70, as illustrated in FIG. 4. The first adaptor 40 comprises a distal end 42 secured to the bidirectional differential pressure sensor 30. The first adaptor 40 conveys fluid received from the first pipe 70 to the bidirectional differential pressure sensor 30. The internal fluid conduit is not represented in FIG. 4, as it is well known in the art.

The second adaptor 50 comprises a distal end 52 secured to the bidirectional differential pressure sensor 30. The second adaptor 50 defines an internal fluid conduit for transmitting fluid received from the second pipe 80 to the bidirectional differential pressure sensor 30. The internal fluid conduit is not represented in FIG. 4, since it is well known in the art. Although shown as being contiguous on FIGS. 1 and 2, the first and second adaptors 40 and 50 could be affixed to different panels of the housing, so as to accommodate fluids coming from different locations or particular space constraints. Furthermore, the first and second adaptors 40, 50 could be aligned horizontally, vertically, diagonally, or not aligned at all.

In a particular example, the first and second adaptors 40 and 50 are integral to the bidirectional differential pressure sensor 30. In an alternative configuration, the first and second adaptors 40 and 50 are releasably connected to the bidirectional differential pressure sensor 30 via connecting means well known in the art.

The bidirectional differential pressure sensor 30 is configured to determine a pressure differential between the fluid received via the first adaptor 40 with respect to the fluid received via the second adaptor 50. The fluid may be any of the following: a gas, a liquid or a combination thereof. The pipes 70 and 80 may be any of the following: a flexible hose, a rigid hose, etc. The bidirectional differential pressure sensor 30 thus compares the pressure between the fluid received from the first adaptor 40 to the pressure received via the second adaptor 50 to generate the pressure differential.

The system 10 may also comprise an electrical connector 100 (e.g. an electrical cable or a wireless connection) between the processing unit 60 and the bidirectional differential pressure sensor 30 for transmitting electrical power from the processing unit 60 to the bidirectional differential pressure sensor 30.

The system 10 may concurrently or alternatively comprise a data transmission connector 102 (e.g. an electrical cable or an optical cable) between the processing unit 60 and the bidirectional differential pressure sensor 30 for transmitting data generated by the bidirectional differential pressure sensor to the processing unit 60 and/or vice-versa. Alternatively, the bidirectional differential pressure sensor 30 comprises a wireless communication module for wirelessly transmitting the data generated by the bidirectional differential pressure sensor 30 to one or more other components either co-located or remotely located, not shown for simplification purposes.

In a particular example, the system 10 is an environment control appliance for controlling one or more controlled appliances dedicated to the regulation of the environment of a building. For example, the system 10 may be a Variable Air Volume (VAV) control appliance for controlling one or more heating, ventilating, and/or air-conditioning (HVAC) systems operating in a VAV mode.

The system 10 may comprise one or more other types of component(s) (e.g. mechanical component, hydraulic component, electric component, electronic component, electro-mechanical component, etc.), in addition to the bidirectional differential pressure sensor 30 and the processing unit 60.

Figure 5:
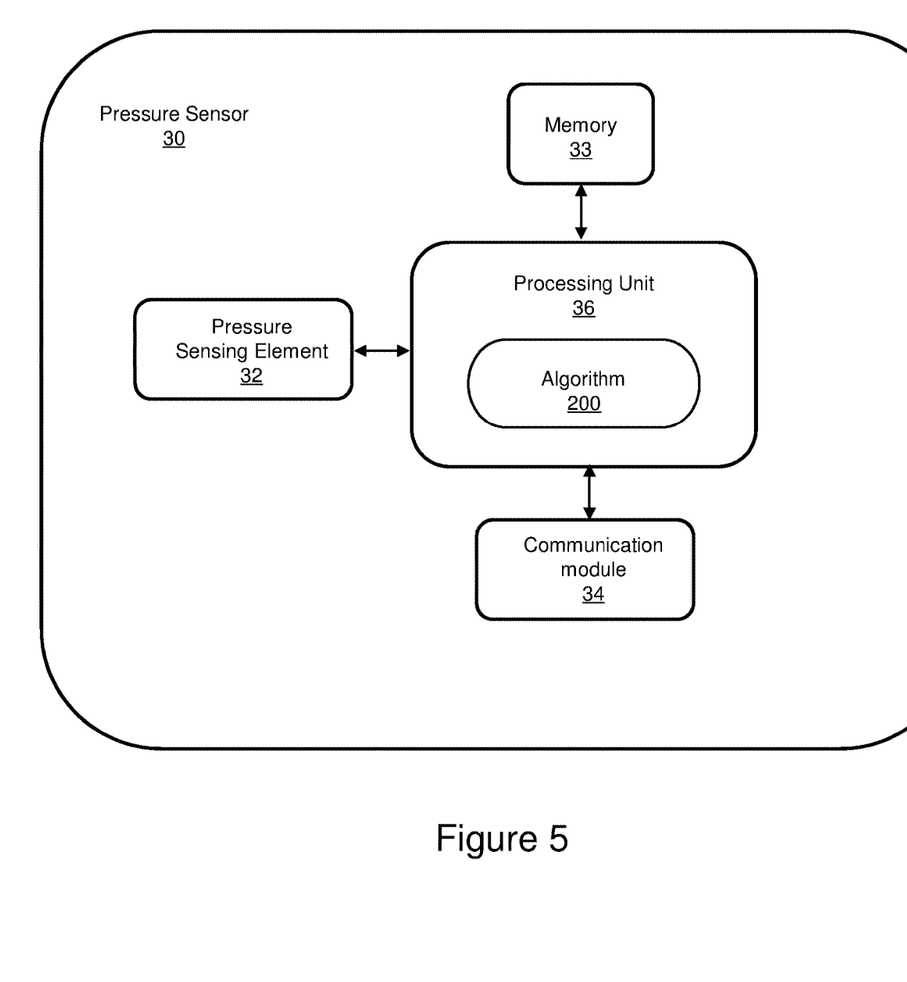
FIG. 5 is a schematic representation of components of the bidirectional pressure sensor represented in FIG. 1.

Reference is now made to FIG. 5, which is an example schematic representation of the bidirectional differential pressure sensor 30.

The bidirectional differential pressure sensor 30 comprises a pressure sensing element 32, which measures the pressure differential between fluid received at the first adaptor 40 with respect to fluid received at the second adaptor 50. Bidirectional differential pressure sensors are well known in the art, and therefore will be cursory described hereinafter.

For example, let's assume that P1 is the pressure of the fluid received via the first adaptor 40 and P2 is the pressure of the fluid received via the second adaptor 50. As mentioned previously, the pressure sensing element 32 determines the pressure differential P1−P2 between the fluid received via the first adaptor 40 with respect to the fluid received via the second adaptor 50. P1−P2 is positive if the pressure P1 of the fluid received via the first adaptor 40 is greater than the pressure P2 of the fluid received via the second adaptor 50. P1−P2 is negative if the pressure P1 of the fluid received via the first adaptor 40 is lower than the pressure P2 of the fluid received via the second adaptor 50. P1−P2 is null if the pressure P1 of the fluid received via the first adaptor 40 is equal to the pressure P2 of the fluid received via the second adaptor 50.

The pressure sensing element 32 may be implemented in various ways well known in the art. For example, the pressure sensing element 32 comprises electro-mechanical device(s) and electronic component(s) for determining the pressure differential. The pressure differential is represented by a current or a voltage of an analog electrical signal. The pressure sensing element 32 comprises an Analog to Digital Converter (ADC) for converting the analog electrical signal into a digital electrical signal representative of the pressure differential, which is transmitted to the processing unit 31.

In the example depicted in FIG. 5, the bidirectional differential pressure sensor 30 further comprises the processing unit 36, memory 33 and a communication module 34. Other components could further be included with the bidirectional differential pressure sensor 30.

Figure 7A:
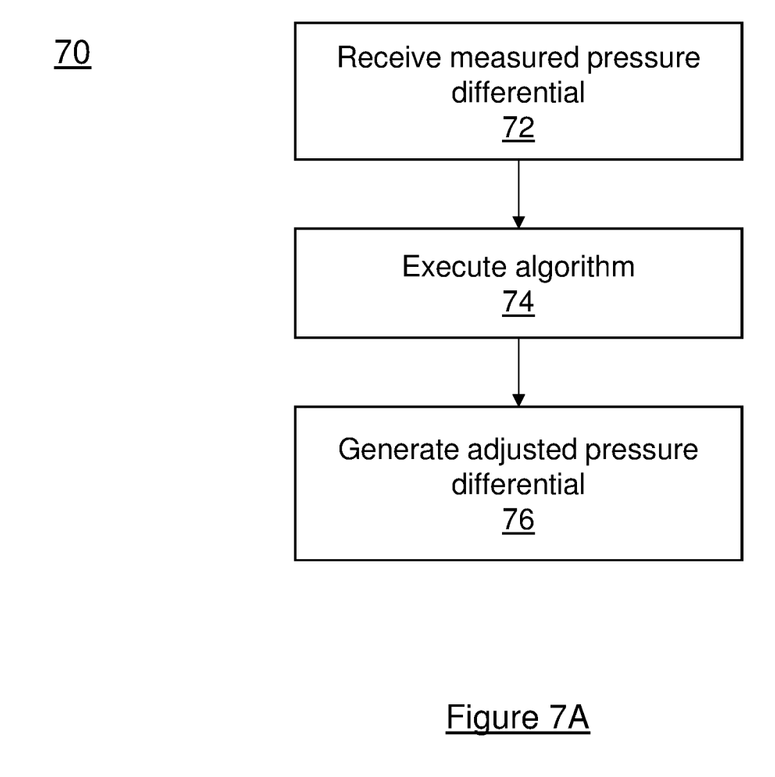
FIGS. 7A, 7B and 7C are flow diagrams of embodiments of the present algorithm.
Figure 7B:
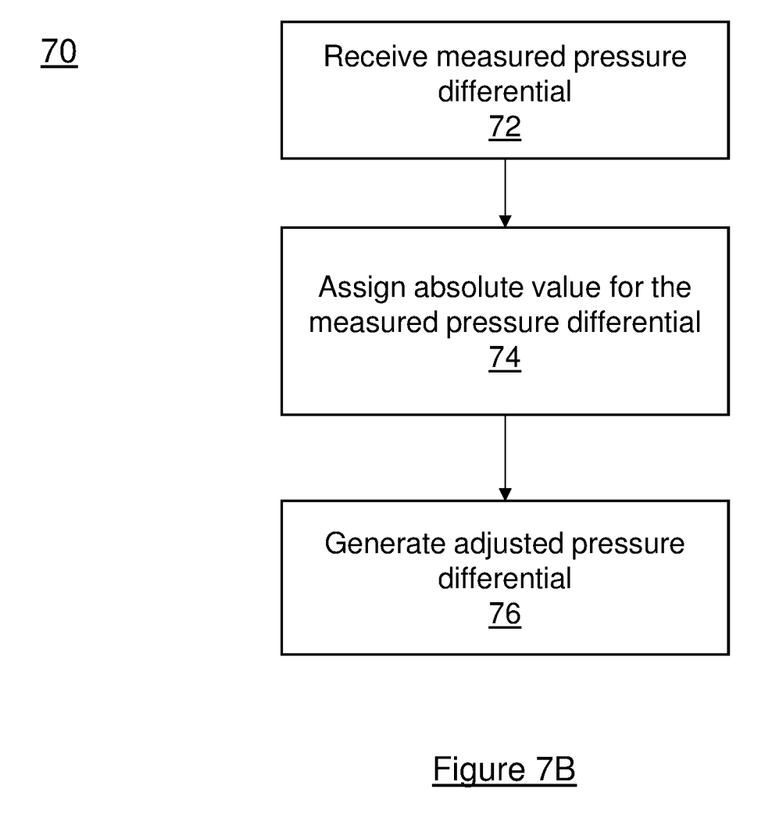
Figure 7C:
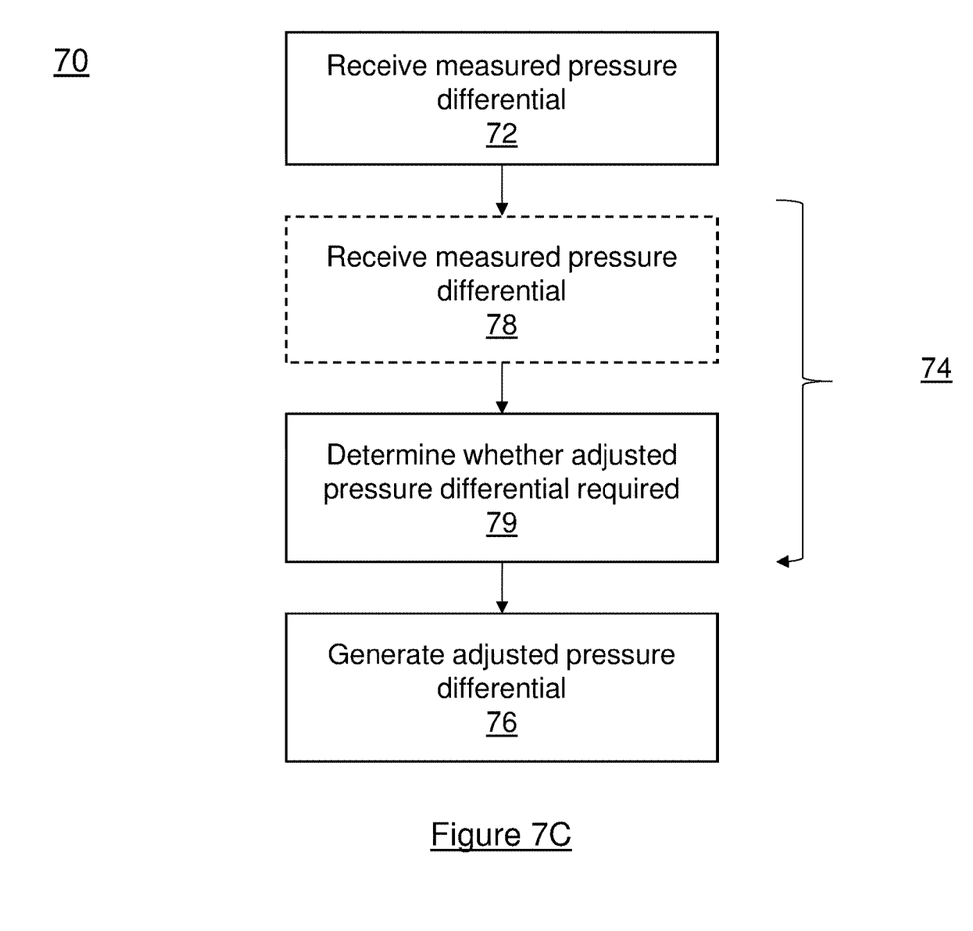

Reference is now further made to FIGS. 7A, 7B and 7C which depict different implementations of the present algorithm 200. The pressure sensing element 32 transmits electrically, electronically or wirelessly the pressure differential measured to the processing unit 36 or 60, depending on the implementation. The processing unit 36 or 60 receives in step 72 the pressure differential measured. The processing unit 36 or 60 then executes an algorithm 200 in step 74 for generating an adjusted pressure differential.

In a first implementation shown on FIG. 7B, the algorithm 200 assigns in step 74 an absolute value to the determined pressure differential. In this first implementation, the adjusted pressure differential thus corresponds to the absolute value of the determined pressure differential. For example, if the determined pressure differential P1−P2 is positive, the adjusted pressure differential is also P1−P2; but if the determined pressure differential P1−P2 is negative, the adjusted pressure differential becomes −(P1−P2)=P2−P1.

In a second implementation shown on FIG. 7C, the algorithm 200 is executed upon initialization of the bidirectional differential pressure sensor 30, and/or upon initialization of the system 10. Upon initialization, the algorithm 200 determines that the measured pressure differential has to be adjusted as the determined differential pressure corresponds to inversed connection of the fluid pipes 70 and 80 to the first and second adaptors 40 and 50. The algorithm 200 receives in step 72 the measured pressure differential. As previously indicated, the algorithm 200 may be executed by the processing unit 36 of the pressure sensor 30, or by the processing unit 60 of the system 10. Optionally, the algorithm may apply a delay for receiving another measured pressure differential (a second measured pressure differential) in step 78. Based on the first measured pressure differential, or the first and second measured pressure differentials if step 78 has been executed, the algorithm 200 determines in step 79 whether the pipes 70 and 80 have been connected inversely to the adaptors 40 and 50. When the pipes 70 and 80 have been connected by a technician in inversed, the measured pressure differential between the first connector 40 and the second connector 50 is an incorrect measured pressure differential.

The algorithm 200 determines based on the measured pressure differential received, whether the measured pressure differential is correct or requires adjustment (for example because the pipes 70 and 80 have been inversely connected to the male connectors 40 and 50). The algorithm 200 determines in step 79 whether the measured pressure differential requires adjustment. If the algorithm determines in step 79 that the measured pressure differential requires adjustment, the algorithm 200 applies the adjustment to generate the adjusted pressure differential in step 76. The adjustment applied by the algorithm 200 may be any of the following: applying an absolute function to the measured pressure differential, applying a correction to the value of the measured pressured differential, applying a hysteresis function to the measured pressure differential, reconfiguring the pressure sensing element 32 to determine the differential pressure between the fluid received by the second adaptor 52 with respect to the fluid received by the first adaptor 42, or any other similar or equivalent function or mathematical correction.

If the algorithm 200 determines in step 79 that the measured pressure differential does not require adjustment, the algorithm 200 uses directly the measured pressure differential as the adjusted pressure differential in step 76. For example, if the measured pressure differential is positive (P1>P2), then the pressure sensing element 32 is not reconfigured; and if the measured pressure differential is negative (P1<P2), then the pressure sensing element 32 is reconfigured to measure P2−P1 instead of P1−P2.

The bidirectional differential pressure sensor 30 comprises memory 33 for storing instructions of computer programs executed by the processing unit 36. The instructions of the computer programs stored by the memory 33 can be uploaded/updated via a communication module 34 of the bidirectional differential pressure sensor 30.

The communication module 34 transmits the adjusted pressure differential either locally or to a remote computing entity. For example, the remote computing entity may be the processing unit 60 of the system 10. In another example, the remote computing entity is located outside of the system 10. For this purpose, the communication module 34 implements at least one of the following: a cellular communication functionality, a Wi-Fi communication functionality, a wireless mesh communication functionality, etc.

In the case where the remote computing entity is the processing unit 60, the data transmission connector 102 between the processing unit 60 and the communication module 34 of the bidirectional differential pressure sensor 30 may be used for transmitting the adjusted pressure differential from the bidirectional differential pressure sensor 30 to the processing unit 60.

The memory 33 may contain various implementations of the algorithm 200, and the bidirectional differential pressure sensor 30 is dynamically configured to use a particular one among the various implementations of the algorithm 200, through a configuration command received via the communication module 34.

Figure 1:
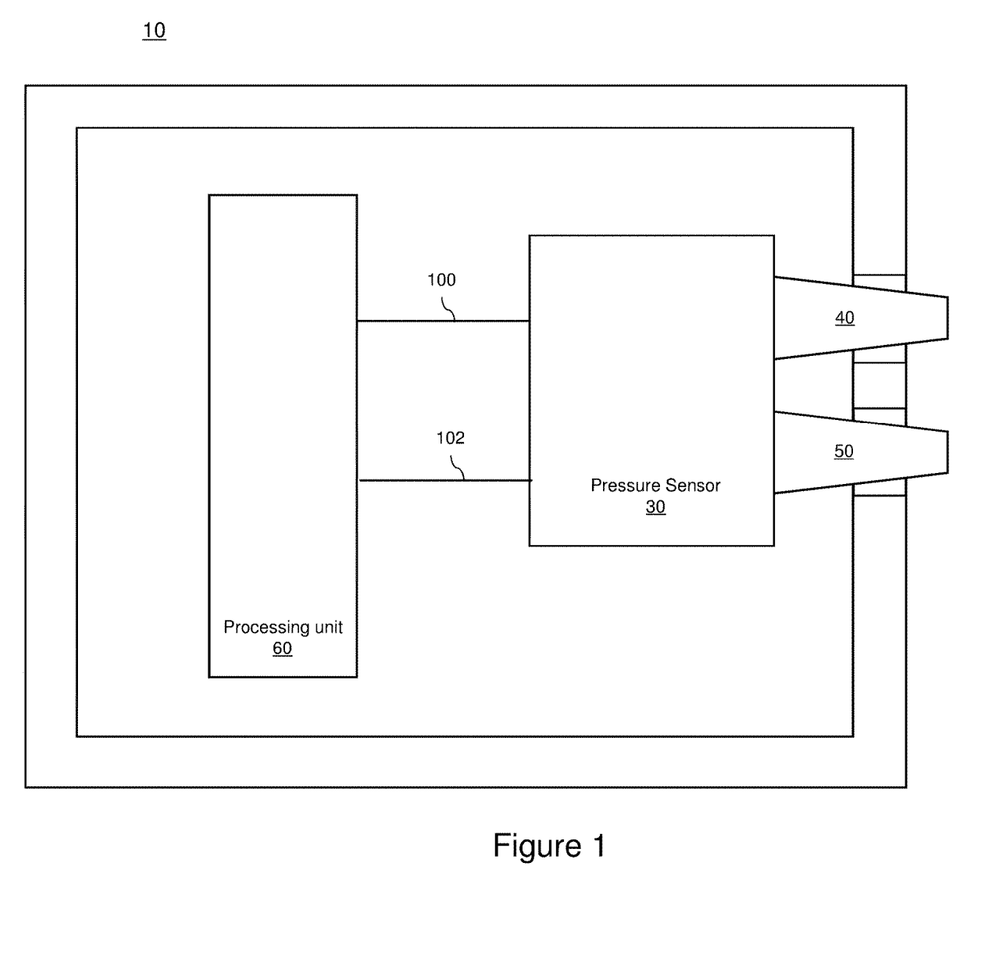
FIG. 1 represents a schematic view of a system comprising a bidirectional pressure sensor.
Figure 2:
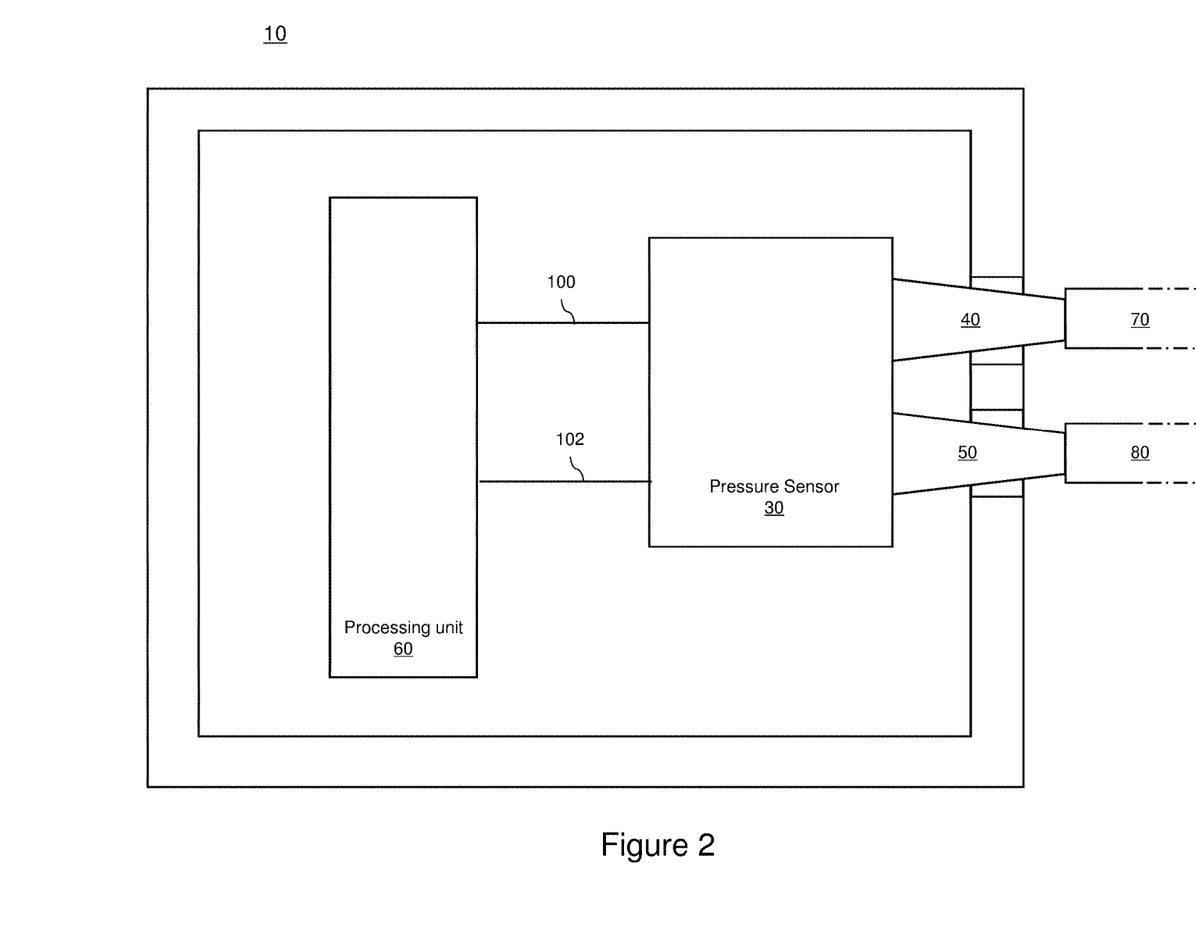
FIG. 2 represents a schematic view of the system of FIG. 1 with two pipes to receive fluid.
Figure 3:
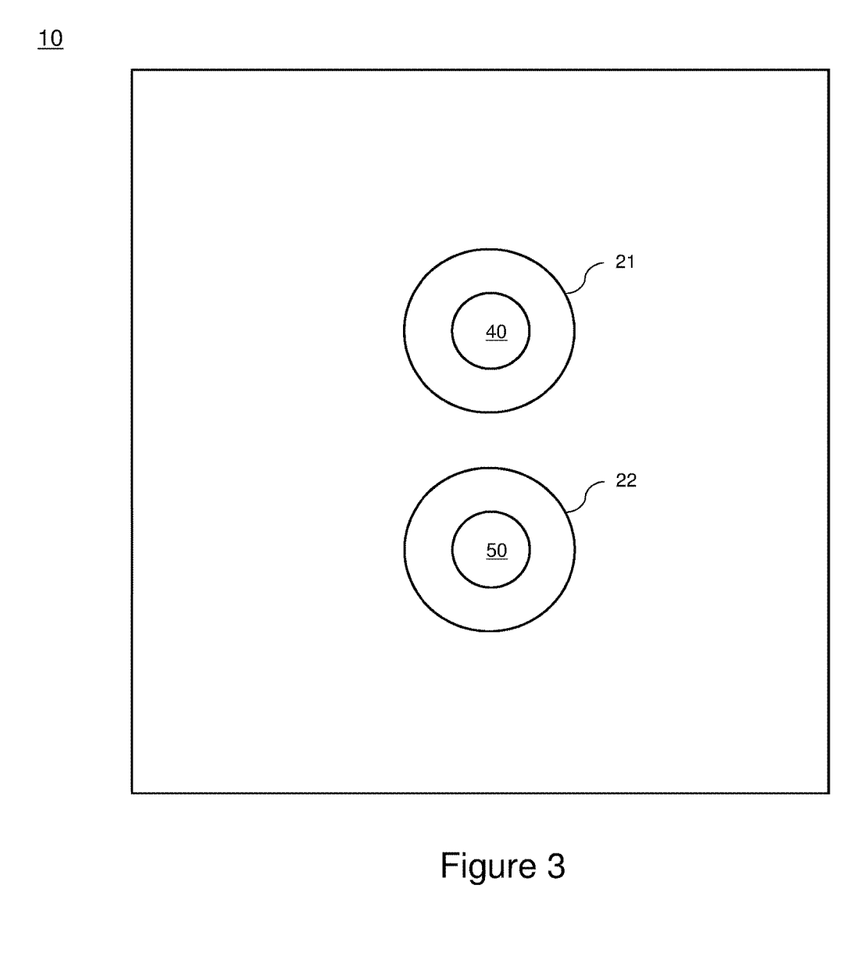
FIG. 3 represents a back elevation view of the system represented in FIG. 1.
Figure 6:
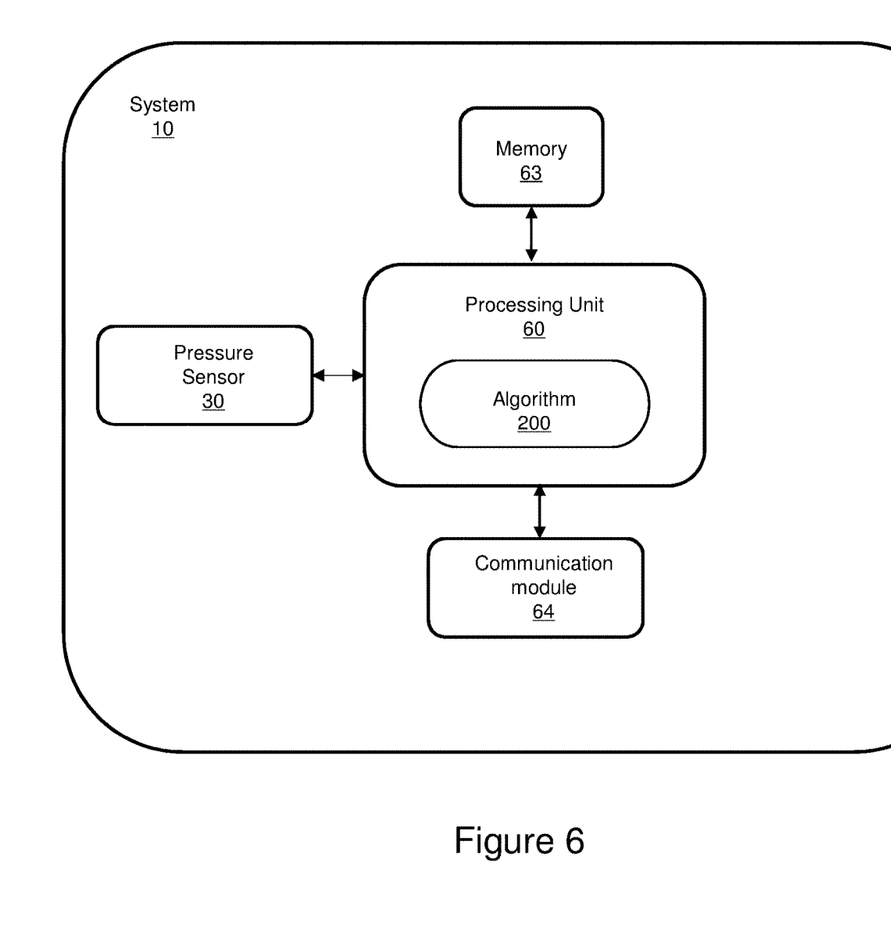
FIG. 6 is an example schematic representation of components of the system of FIG. 1.

Reference is now made concurrently to FIGS. 2, 5 and 6, where FIG. 6 is a schematic representation of components of the system 10.

In an alternative configuration, the algorithm 200 is not executed by the processing unit 36 of the bidirectional differential pressure sensor 30, but by the processing unit 60.

In this alternative configuration, the pressure sensing element 32 of the bidirectional differential pressure sensor 30 determines the pressure differential between the fluid received via the first adaptor 40 with respect to the fluid received via the second adaptor 50. The pressure sensing element 32 transmits the determined pressure differential to the processing unit 60. The data transmission connector 102 between the processing unit 60 and the communication module 34 of the bidirectional differential pressure sensor 30 may be used for transmitting the determined pressure differential from the pressure sensing element 32 to the processing unit 60. The processing unit 60 then executes the algorithm 200 as previously describe, to adjust the determined pressure differential thereby generating the adjusted pressure differential.

Alternatively, the bidirectional differential pressure sensor 30 may not include the processing unit 36, and the determined pressure differential is directly transmitted from the pressure sensing element 32 to the communication module 34, for further transmission to the processing unit 60 hosted by the system 10.

The processing unit 60 executes the algorithm 200 for generating the adjusted pressure differential, based on the pressure differential determined and transmitted by the bidirectional differential pressure sensor 30. As mentioned previously, various implementations of the algorithm 200 may be executed by the processing unit 60.

The system 10 comprises memory 63 for storing instructions of computer programs executed by the processing unit 60. For instance, the memory 63 stores the instructions of a computer program implementing the algorithm 200 executed by the processing unit 60. The instructions of the computer programs stored by the memory 63 can be uploaded/updated via a communication module 64.

The adjusted pressure differential generated by the algorithm 200 executed by the processing unit 60 of the system 10 or by the processing unit 36 of the bidirectional differential pressure sensor 30 may be used to perform environment control operations.

Alternatively or complementarily, the communication module 64 transmits the adjusted pressure differential to a remote computing entity. For instance, the communication module 64 is capable of wirelessly transmitting the adjusted pressure differential to the remote computing entity. For this purpose, the communication module 64 implements at least one of the following: a cellular communication functionality, a Wi-Fi communication functionality, a wireless mesh communication functionality, etc.

The adjusted pressure differential generated by the algorithm 200 executed by processing unit 60 of the system 10 or by the processing unit 36 of the bidirectional differential pressure sensor 30 can also be displayed on a display (not represented in the Figures) of the system 10. For instance, the display is a normal screen or a touchscreen. The display may be directly or indirectly electronically connected to the processing unit 60 for receiving data to be displayed.

Although the present disclosure has been described hereinabove by way of non-restrictive, illustrative embodiments thereof, these embodiments may be modified at will within the scope of the appended claims without departing from the spirit and nature of the present disclosure.

What is claimed is:

1. A system comprising:
   a bidirectional differential pressure sensor;
   a first adaptor comprising a proximal end configured to receive a first pipe, a distal end secured to the bidirectional differential pressure sensor, and an internal fluid conduit for conveying fluid received from the first pipe to the bidirectional differential pressure sensor; and
   a second adaptor comprising a proximal end configured to receive a second pipe, a distal end secured to the bidirectional differential pressure sensor, and an internal fluid conduit for conveying fluid received from the second pipe to the bidirectional differential pressure sensor;
   the bidirectional differential pressure sensor comprising:
      a pressure sensing element determining a pressure differential between fluid received via the first adaptor with respect to fluid received via the second adaptor; and
      a processing unit executing an algorithm for generating an adjusted pressure differential based on the pressure differential determined by the pressure sensing element, wherein executing the algorithm comprises one of the following: assigning by the processing unit an absolute value to the determined pressure differential, applying by the processing unit a hysteresis function to the determined pressure differential, or reconfiguring by the processing unit the pressure sensing element for determining the pressure differential between fluid received via the second adaptor with respect to fluid received via the first adaptor.

2. The system of claim 1, wherein executing by the processing unit the algorithm for generating the adjusted pressure differential comprises reconfiguring by the processing unit the pressure sensing element for determining the pressure differential between fluid received via the second adaptor with respect to fluid received via the first adaptor by:
   receiving by the processing unit a measured pressure differential determined by the pressure sensing element;
   determining by the processing unit that the pressure sensing element shall be reconfigured based on the measured pressure differential; and
   performing by the processing unit the reconfiguration of the pressure sensing element to determine the pressure differential between fluid received via the second adaptor with respect to fluid received via the first adaptor; and
   receiving by the processing unit the adjusted pressure differential determined by the reconfigured pressure sensing element.

3. The system of claim 1, wherein the pressure sensor comprises a communication module for transmitting the adjusted pressure differential to a remote computing entity.

4. The system of claim 1, wherein the fluid is one of: a gas, a liquid or a combination thereof.

5. A bidirectional differential pressure sensor comprising:
   a first adaptor comprising an end configured to receive a first pipe;
   a second adaptor comprising an end configured to receive a second pipe;
   a pressure sensing element determining a pressure differential between fluid received via the first adaptor with respect to fluid received via the second adaptor; and
   a processing unit executing an algorithm for generating an adjusted pressure differential based on the pressure differential determined by the pressure sensing element, wherein executing the algorithm comprises one of the following: assigning by the processing unit an absolute value to the determined pressure differential, applying by the processing unit a hysteresis function to the determined pressure differential, or reconfiguring by the processing unit the pressure sensing element for determining the pressure differential between fluid received via the second adaptor with respect to fluid received via the first adaptor.

6. The bidirectional differential pressure sensor of claim 5, wherein executing by the processing unit the algorithm for generating the adjusted pressure differential comprises reconfiguring by the processing unit the pressure sensing element for determining the pressure differential between fluid received via the second adaptor with respect to fluid received via the first adaptor by:
   receiving by the processing unit a measured pressure differential determined by the pressure sensing element;
   determining by the processing unit that the pressure sensing element shall be reconfigured based on the measured pressure differential;
   performing by the processing unit the reconfiguration of the pressure sensing element to determine the pressure differential between fluid received via the second adaptor with respect to fluid received via the first adaptor; and receiving by the processing unit the adjusted pressure differential determined by the reconfigured pressure sensing element.

7. The bidirectional differential pressure sensor of claim 5, further comprising a communication module for transmitting the adjusted pressure differential to a remote computing entity.

8. The bidirectional differential pressure sensor of claim 5, further comprising a data transmission connector for transmitting the adjusted pressure differential to a processing unit.

9. The bidirectional differential pressure sensor of claim 5, wherein the fluid is one of: a gas, a liquid or a combination thereof.

10. A system comprising:
a bidirectional differential pressure sensor comprising:
  a first adaptor comprising an end configured to receive a first pipe;
  a second adaptor comprising an end configured to receive a second pipe; and
  a pressure sensing element determining a pressure differential between fluid received via the first adaptor with respect to fluid received via the second adaptor; and
a processing unit executing an algorithm for generating an adjusted pressure differential based on the pressure differential determined by the pressure sensing element, wherein executing the algorithm comprises one of the following: assigning by the processing unit an absolute value to the determined pressure differential, applying by the processing unit a hysteresis function to the determined pressure differential, or reconfiguring by the processing unit the pressure sensing element for determining the pressure differential between fluid received via the second adaptor with respect to fluid received via the first adaptor.

11. The system of claim 10, further comprising a data transmission connector for transmitting the adjusted pressure differential.

12. The system of claim 10, wherein the fluid is one of: a gas, a liquid or a combination thereof.

13. The system of claim 10, configured as an element of a Variable Air Volume (VAV) control system.

14. The system of claim 10, wherein executing by the processing unit the algorithm for generating the adjusted pressure differential comprises reconfiguring by the processing unit the pressure sensing element for determining the pressure differential between fluid received via the second adaptor with respect to fluid received via the first adaptor by:
  receiving by the processing unit a measured pressure differential determined by the pressure sensing element;
  determining by the processing unit that the pressure sensing element shall be reconfigured based on the measured pressure differential;
  performing by the processing unit the reconfiguration of the pressure sensing element to determine the pressure differential between fluid received via the second adaptor with respect to fluid received via the first adaptor; and
  receiving by the processing unit the adjusted pressure differential determined by the reconfigured pressure sensing element.

* * * * *